United States Patent [19]
Stenning et al.

[11] Patent Number: 6,003,460
[45] Date of Patent: Dec. 21, 1999

[54] SHIP BASED GAS TRANSPORT SYSTEM

[76] Inventors: David G. Stenning, 611-46 Avenue S.W., Calgary Alberta, Canada, T2S 1B9; James A. Cran, 625 - Sifton Boulevard S. W., Calgary Alberta, Canada, T2T 2K8

[21] Appl. No.: 09/102,266

[22] Filed: Jun. 22, 1998

Related U.S. Application Data

[60] Division of application No. 08/724,364, Oct. 1, 1996, Pat. No. 5,839,383, which is a continuation-in-part of application No. 08/550,080, Dec. 30, 1995, abandoned.

[51] Int. Cl.⁶ .................................................. B63B 25/00
[52] U.S. Cl. ........................................... 114/72; 114/74 R
[58] Field of Search ................................ 114/74 A, 74 R, 114/74 T, 220, 256, 72, 73, 1; 220/901, 89.1; 137/1, 256, 263, 571

[56] References Cited

U.S. PATENT DOCUMENTS

| | | |
|---|---|---|
| 3,432,060 | 3/1969 | Cowley . |
| 3,760,834 | 9/1973 | Shonerd et al. . |
| 3,762,407 | 10/1973 | Shonerd . |
| 3,762,604 | 10/1973 | Shonerd . |
| 4,004,535 | 1/1977 | Oiern et al. ........................... 114/74 A |
| 4,438,719 | 3/1984 | Finsterwalder ......................... 114/74 A |
| 4,576,015 | 3/1986 | Crawford . |
| 4,695,520 | 9/1987 | Koper et al. . |
| 4,932,403 | 6/1990 | Scholley . |
| 5,036,845 | 8/1991 | Scholley . |
| 5,127,399 | 7/1992 | Scholley . |
| 5,517,984 | 5/1996 | Sanders . |
| 5,529,061 | 6/1996 | Sanders . |
| 5,582,164 | 12/1996 | Sanders . |

FOREIGN PATENT DOCUMENTS

| | | |
|---|---|---|
| 767338A2 | 9/1997 | European Pat. Off. . |
| 2047812 | 9/1992 | Russian Federation . |
| 821520 | 10/1959 | United Kingdom . |
| 851830 | 10/1960 | United Kingdom . |
| 1202241 | 8/1970 | United Kingdom . |
| 2204390 | 11/1988 | United Kingdom . |
| 9011235 | 10/1990 | WIPO . |
| 9202387 | 2/1992 | WIPO . |

OTHER PUBLICATIONS

"Coil Tubing Applications for Underground Storage" Hampton Fowler and Don Holcombe; Haliburton Energy Services—Society of Petroleum Engineers; Eastern Regional Conference; Nov. 8–11, 1994.

"A Slim Hole Horizontal Well Application in a Gas Storage Reservoir: A Case Study"; M. E. Gredell and M. A. Benson; Panhandle Eastern Pipeline Co.; AGA Operating Section Conference; May 7–10, 1995.

*Primary Examiner*—Stephen Avila
*Attorney, Agent, or Firm*—Vinson & Elkins, L.L.P.

[57] ABSTRACT

A gas storage system formed of a continuous pipe wound in plural layers, each layer having plural loops. The pipe may be distributed within a container, which may serve as a carousel for winding the pipe and as a gas containment device. When containers, each containing a continuous pipe are stacked upon each other, the weight of upper containers may be born by the walls of lower containers, thus preventing lower layers of pipe from suffering stresses due to crushing by upper layers. A method of transporting gas to a gas distribution facility including obtaining a supply of gas at a gas supply point remote from the gas distribution facility, injecting the gas into a continuous pipe bent to form plural layers, each layer including plural loops of pipe, transporting the continuous pipe along with the gas to the gas distribution facility preferably in a ship and discharging the gas at the gas distribution facility. It is preferred that cooling of the pipe during discharging of the gas be conserved so that during subsequent filling the pipe is initially cool. Also, in a further aspect of the invention, during filling, the gas pressure should be maintained as constant as possible for example by controlled release of an incompressible liquid from the pipe as the pipe is filled with gas. Energy from the incompressible liquid may then be recovered or dissipated outside of the pipes.

21 Claims, 10 Drawing Sheets

6,003,460

SHIP BASED GAS TRANSPORT SYSTEM

This is a division of application Ser. No. 08/724,364 filed Oct. 1, 1996 now U.S. Pat. No. 5,839,383, which was a continuation-in-part of application Ser. No. 08/550,080 filed Dec. 30, 1995, now abandoned.

FIELD OF THE INVENTION

This invention relates to apparatus and methods for the transport and storage of fluids; more particularly, this invention relates to the transport and storage of compressed gases such as natural gas.

BACKGROUND OF THE INVENTION

This is a continuation-in-part application of U.S. patent application Ser. No. 08/550,080 filed Oct. 30, 1995.

In the parent application a ship based gas transportation system in which a plurality of cylinders are organized into cells of 3 to 30 cylinders per cell was also disclosed. A manifold and valve system was described for connecting the cylinders to on shore loading and off-loading terminals.

The amount of equipment and the complexity of the inter-connection of the manifolding and valving system in the ship based gas transportation system bears a direct relation to the number of individual cylinders carried on-board the transport ship. Accordingly, in large ships there is a significant expense associated with the manifolding and valving connecting the gas cylinders. Thus, the need has arisen to find a storage system for compressed gas that can both contain larger quantities of compressed gas and simplify the system of complex manifolds and valves.

SUMMARY OF THE INVENTION

A gas storage system, particularly adapted for transportation of large quantities of compressed gas on board a ship, includes a large storage volume provided by coils of substantially continuous pipe. The use of long lengths of continuous pipe for gas storage leads to a significantly reduced cost as less interconnecting equipment is required between gas storage containers.

There is therefore provided, in accordance with the present invention, a gas storage system formed of a continuous pipe. The continuous pipe is preferably packed or coiled into a container. In one aspect of the invention, the continuous pipe is wound in plural layers, each layer having plural loops. The continuous pipe, however, may be distributed within a container in a variety of configurations. The container for the coiled pipe may serve several functions. First, the container may act as a carousel for winding the pipe. Second, the container may serve as a means for lifting the pipe. Third, the container may serve as a gas containment device for the atmosphere surrounding the continuous pipe.

When containers, each containing a continuous pipe, are stacked upon each other the weight of upper containers may be born by the walls of lower containers, thus preventing the lower layers of pipe from having to withstand the crushing forces from the weight of the upper layers of pipe, with the resulting induced stresses that reduce the acceptable gas pressure values.

In accordance with a further aspect of the invention, there is provided a method of transporting gas to a gas distribution facility including obtaining a supply of gas at a gas supply point remote from the gas distribution facility, injecting the gas into a continuous pipe bent to form plural layers, each layer including plural loops of pipe, transporting the continuous pipe along with the gas to the gas distribution facility preferably in a ship and discharging the gas at the gas distribution facility. It is preferred that cooling of the continuous pipe storage system during discharging at the gas distribution facility be conserved in the gas storage system so that during subsequent filling at the gas supply point the continuous pipe is initially cool.

The transported gas may be cooled during discharging by reducing pressure of the gas adiabatically, circulating a storable fluid against the flow of the gas in a heat exchanger and then circulating the storable fluid into the continuous pipe gas storage system.

Cold in the gas may be preserved by piping the cold gas through a heat exchanger against, for example, a flow of sea water, and then storing the chilled sea water on the ship. Gas being filled into the continuous pipe storage system at a gas supply point may then be cooled using the cooled sea water.

The gas storage system of the present invention which uses continuous pipe wound to largely fill an enclosed volume has several advantages. First, the pipe diameter may be made smaller than 12 inches, thus increasing fracture toughness and decreasing the probability and severity of failure. Second, the technology for the continuous production of lengths of pipe is well known, particularly in the oil industry, thereby facilitating production of the continuous pipe. Third, complicating design features such as large domes, typically welded to the ends of cylinders are not required. Fourth, fewer control valves, pressure relief valves and related equipment are required when continuous pipe is used as compared to using many cylinders. This leads to a reduction in cost. Fifth, the use of continuous lengths of relatively small diameter pipe may also permit more cold to be retained in the pipe steel after the gas is discharged, as compared with larger diameter cylinders. This retention of cold in the pipe steel facilitates re-filling the continuous pipe storage system with gas of the gas supply point.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

A loop of pipe is defined herein to mean a length of pipe that turns back on itself, so that fluids travelling within the pipe turn more than 90°. A layer of pipe is defined herein to mean a set of pipes that are spaced laterally from each other and that occupy a band whose thickness is approximately equal to the diameter of one of the pipes. In operation, a layer may be horizontal, vertical or at any angle there between.

It is understood that the material employed to make the continuous pipe used in practising the invention will be ductile and not brittle at operational fluid transport pressures and temperatures, and that the material is impervious to gas stored within the continuous pipe. It will also be understood that while very long lengths of pipe are ideal, it may be necessary to make intermediate connections between long pipe sections to facilitate manufacturing. The continuous pipe may be fabricated from any normal grade of steel, for example X70, but the pipe steel may also be quenched and tempered for increased strength after all welding is complete. Alternatively, the continuous pipe may also be wrapped with high tensile steel wire.

Figure 1:
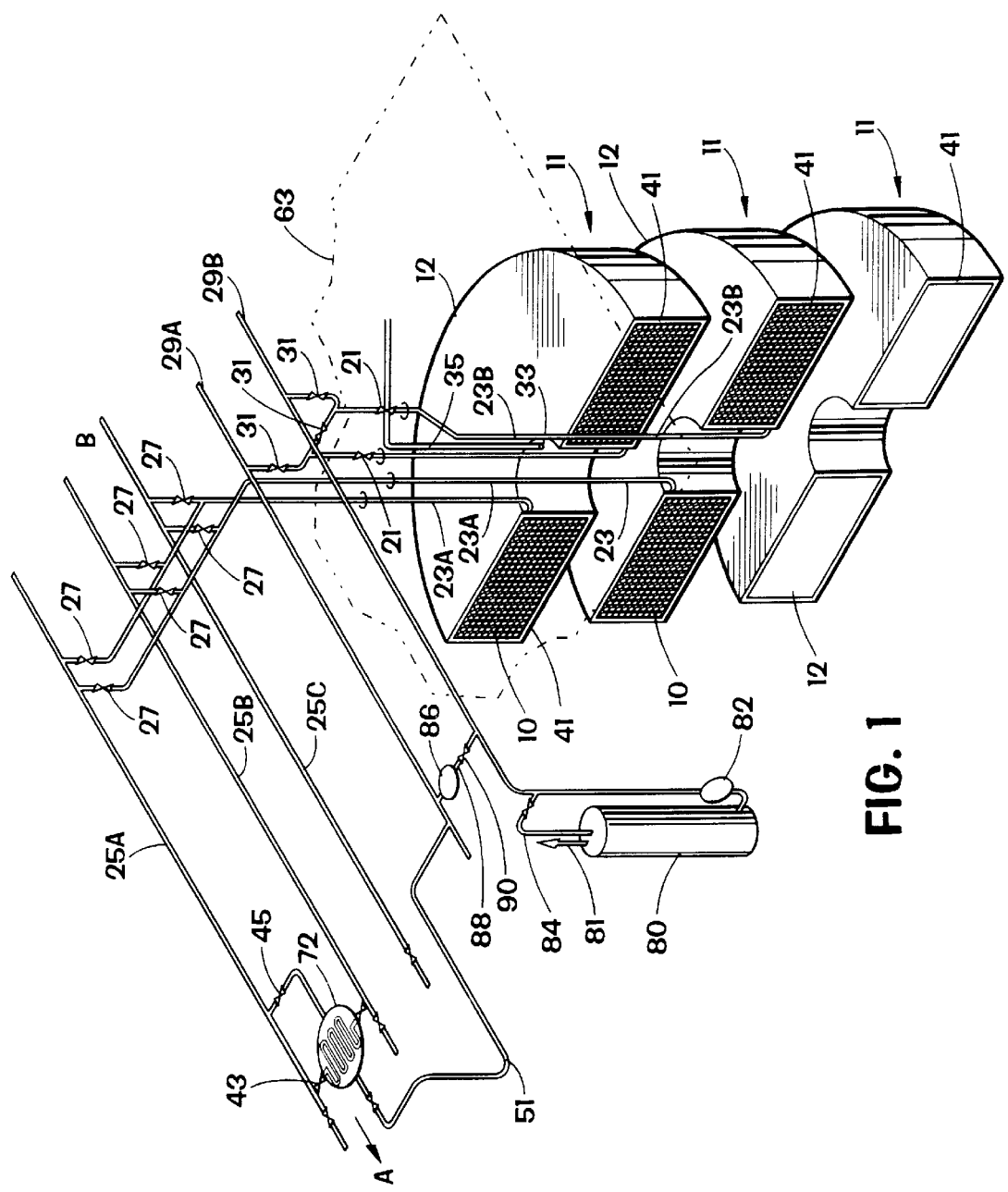
FIG. 1 shows an exemplary coiled continuous pipe gas storage system according to the invention adapted for the transportation of gas by ship.
Figure 3:
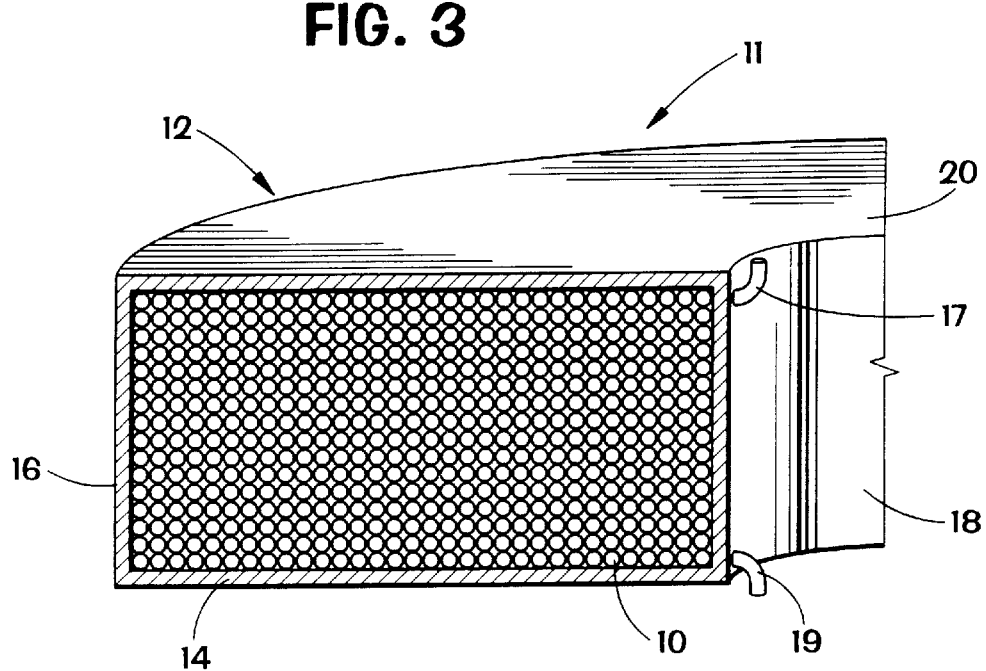
FIG. 3 is a perspective view, partly in section, showing continuous pipe wound in a container according to an embodiment of the invention, and demonstrating both cubic and hexagonal packing.

An exemplary gas storage device 11 is shown in FIG. 3. Multiple gas storage devices 11 are shown in FIG. 1.

The gas storage device 11 of the present invention is made by distributing or coiling a continuous pipe 10 within a container 12 in plural layers, each layer being formed of plural loops of pipe. Any openings in the continuous pipe 10 that allow flow of gas into or out of the pipe 10, such as at the ends of the pipe 17, 19, are provided with valves, for example, valves 21 in FIG. 1. The valves allow the continuous pipe 10 to be sealed for the storage and transportation of gas. Each length of pipe 10 should also be provided with a pressure safety valve (not shown) to allow release of gas over a preset pressure.

The container 12 has a base 14, an outer containment side wall 16, an inner containment side wall 18 and a top 20. The inner containment side wall 18 forms a central core, when the container is shaped in the form of a spool. The container 12 may also provide a carousel function, namely it may provide a support into which the continuous pipe 10 may be wound and then lifted, thus making the pipe easier to handle and load, for example in a ship. In addition, the container 12 distributes the load of the continuous pipe 10 to the outside walls of underlying containers 12, such as the stack of containers 12 illustrated in FIG. 9, in which the weight of the continuous pipe 10 is born by the side walls 16 and 18.

Ends 17, 19 of the continuous pipe 10 preferably extend through a gas tight aperture in the interior wall 18 of the container 12. As shown in FIG. 1 vertical pipes 23A may be connected to the ends 17 of the continuous pipe 10 to connect them to high, medium or low pressure manifolds 25A, 25B, 25C respectively for charging the continuous pipe 10 with gas at a gas supply point and discharging gas from the continuous pipe 10 at a gas distribution facility. The manifolds 25A, 25B and 25C are preferably on the deck 63 of a ship, while the containers 12 are stored in the hold. Valves 27 on the pipes 23A may be used for control of the flow of gas from the manifolds 25A–25C to and from the continuous pipes 10. Vertical pipes 23B may be connected to the ends 19 to connect them to high and low pressure fluid lines 29A and 29B. Valves 31 on lines 23B may be used to control fluid flow into and out of the continuous pipes 10. Alternatively, the ends 17, 19 may extend through the exterior wall 16 of the container 12 instead of through the interior wall 18.

The base 14, side walls 16 and 18 and top 20 of the container 12 are preferably sealed so as to be air tight. This air tight seal provides the container 12 with a containment function in relation to fluids carried by the continuous pipe 10 or the container 12 or both. The container 12 may also be filled with a supporting matrix of material, such as a dry inert powder, a cement, a liquid, such as water, or a conventional mud such as is used in drilling wells. The supporting matrix material may have a specific gravity greater than 1, to assist in supporting the load of the continuous pipe 10. Filling the container 12 with a supporting matrix may be particularly advantageous where the specific gravity of the pipe and stored gas combination is about equal to the specific gravity of the supporting matrix. In this instance, more layers of continuous pipe 10 may be stacked upon each other without increasing the risk of exceptional stresses on the inside walls of the continuous pipe.

Alternately, in cases where the continuous pipe 10 does not need support, the container 12 may be filled with a dry inert gas such as nitrogen, air or exhaust gases. Preferably, a fan or like means (not shown) can be provided to circulate the atmosphere within the container 12 by means of ducting (not shown) which enters and exits the container 12 via sealed apertures (not shown). It is also preferable that the atmosphere in the container 12 be periodically tested for the presence of escaping gas.

For example, acoustic monitors may also be placed in the containers 12. Such acoustic monitors will sense either the noise made by the leaking gas or the sound of the crystalline metal in the continuous pipe 10 if a fault occurs and subsequently grows in the pipe steel. In addition, the atmosphere within the container and external to the continuous pipe 10 may be sniffed with commonly available sniffing equipment to detect the presence of leaking gas.

It is believed that leaks in the continuous pipe 10 will start small. Once detected, the affected coil of the continuous pipe 10 will be promptly emptied and the leak repaired. Should the leak grow rapidly to a significant size, the pressure will rise inside the container 12. The walls of the container 12, for example, the upper wall of the central core, should be provided with conventional rupture disks or collapsible panels 33, set to open before the pressure inside the container 12 reaches a level where it might damage some other part of the walls of the container 12. The gas flow from such a rapid leak will then be conducted away by ventilation ducts 35 and vented via a chimney of approved height. It is believed that such double containment of pressurized gas will be, and also be recognized by regulatory agencies, as exceedingly safe so that lower values for the safety factor of the pipe relative to bursting may be used with regulatory approval.

Figure 2A:
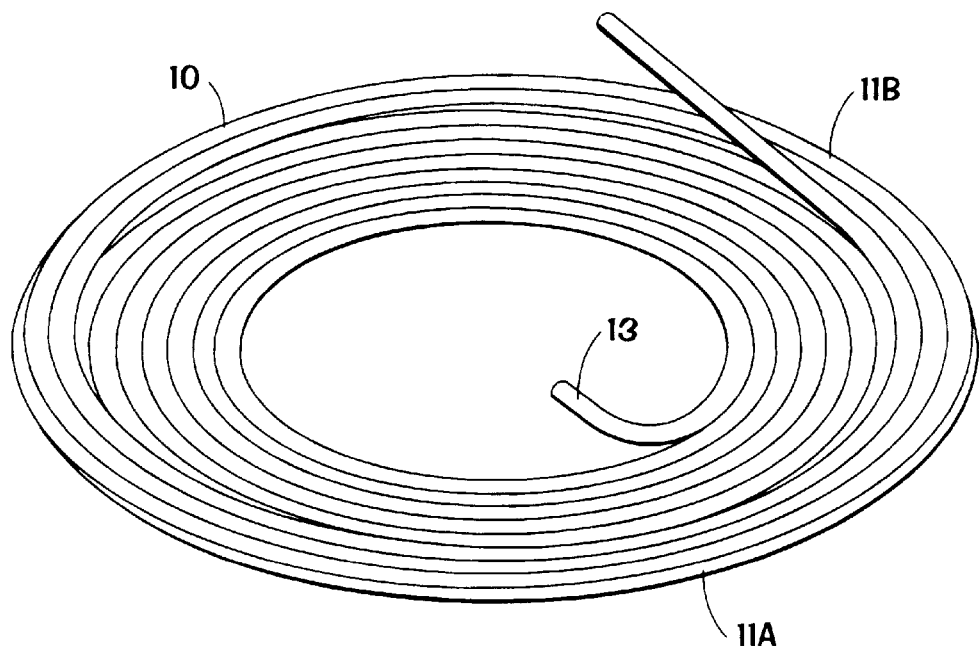
FIG. 2A is a perspective view of a continuous pipe coiled in accordance with a first embodiment of the invention.

Referring now to FIG. 2A, the continuous pipe may be coiled on the base 14 of the container 12 in alternating layers from the outside to the inside and from the inside to the outside. Layer 11A in FIG. 2A is coiled from the inside to the outside, while layer 11B is coiled from the outside to the inside on top of layer 11A. In this manner, the continuous pipe 10 can be installed in the container 12 by winding the pipe around the central core defined by the inner wall 18, preferably beginning with the inside and ending at the outside. Many layers of continuous pipe 10 may be wound on the core as the lower layers of pipe 10 are capable of supporting the upper layers of pipe without the risk of the pipe 10 suffering significantly increased stress in addition to that due to the internal pressure of pressurized gas. The maximum number of layers of pipe that may be supported on any given layer of pipe is readily found from pipe strength calculations. As an example, a 6 inch outside diameter pipe may be wound in a 40 ft wide container about 10 feet high, hence with about 20 layers and about 30 loops (each loop consisting in this case of one 360° loop of pipe), resulting in a length of continuous pipe in the order of 9 miles. The central core may be in the order of 10 ft wide for a 6 inch pipe. Pipe outside diameters of between 1 inch and 10 inches are preferred. The size of the inner core of the container 12 depends on the minimum bend of the pipe, which in turn depends on the temperature at which the continuous pipe is bent and the material from which the continuous pipe is made. For example, cold bending of continuous pipe made from X70 welded plate steel results in about a 10 D (diameter of pipe) minimum radius. Hot bending may reduce the minimum radius to 3D.

Winding continuous pipe in the manner shown in FIG. 2A results in partial cubic and partial hexagonal packing as shown in FIG. 3, which shows a section through the layers of continuous pipe. In cubic packing, each pipe section abuts four other pipe sections, one above, one below and one on each side. In cubic packing the pipe 10 fills about 78.5% of the space in the container 12. In hexagonal packing, each pipe section has six point contact with adjacent pipe. This results in an approximately 90.7% space fill of the container 12. Hexagonal packing is superior to cubic packing both in terms of space filling and in terms of reducing the effect of transverse crushing forces on the circumferential stress of lower parts of the pipe 10. In the case of the coil shown in FIGS. 1 and 3, perfectly cubic and perfectly hexagonal packing occurs along lines at 90° to each other. If the axes of perfect hexagonal packing are rotated slowly around the coil, then it is believed possible to obtain an average packing density of about 84.6%.

As shown in the embodiment in FIG. 2A if the axis of the coil is vertically oriented in use, it can be assured that fluids in the continuous pipe 10 will drain to one end of the pipe, for example end 13 shown. The base 14 of the container 12 need not be flat but may be raised or lowered in the center, for example to form either a pyramidal or conical shape to facilitate drainage of fluids from the continuous pipe. In the case of a raised central portion of the base 14 of the container 12, the valved end of the pipe 10 should be at the outside of the container 12.

Figure 2B:
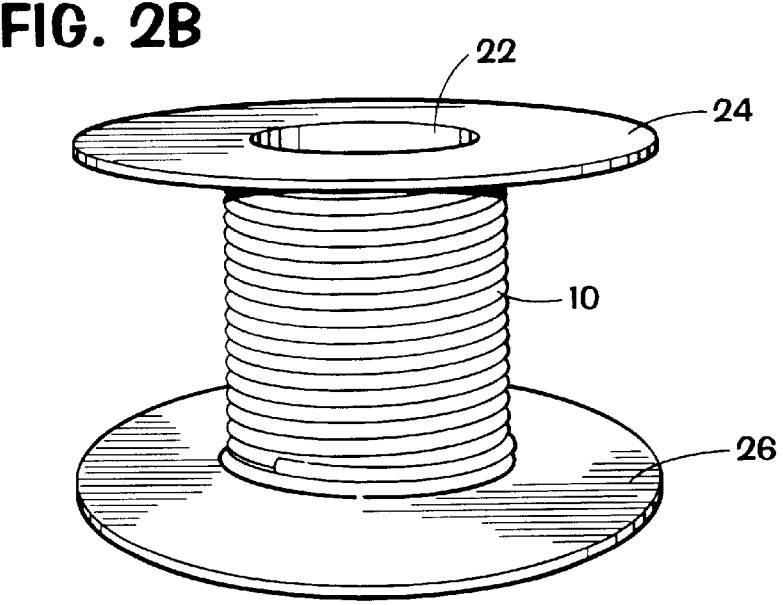
FIG. 2B is a perspective view of a continuous pipe gas storage system in accordance with a second embodiment of the invention.

In the embodiment shown in FIG. 2B the pipe 10 is wound on a core 22. Winding proceeds axially from one end plate 24 to the other end plate 26. This forms a reel type of winding. The core 22 and end plates 24 and 26 together form a support for the continuous pipe 10. The same winding considerations apply to the embodiment of FIG. 2B as for FIG. 2A.

Figure 4:
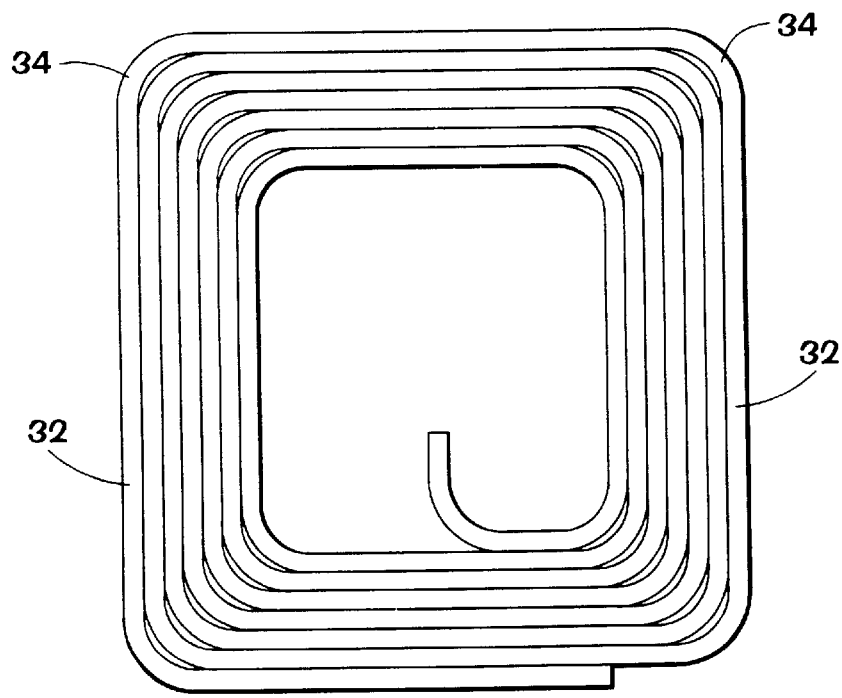
FIG. 4 is a plan view of continuous pipe wound with minimum radius turns to fill a rectangular container.

In the embodiment of FIG. 4, straight sections 32 alternate with bends 34 to form in this case a square, but rectangles, hexagons or other polygonal shapes could also be formed. The same winding considerations apply as for the embodiment of FIG. 2A. Such an embodiment could be used to fill the entire hold of a ship. However, a configuration with straight and bent sections is harder to wind, and thus is preferred when justified by significantly improved packing of coils in the ship's hold.

Figure 5:
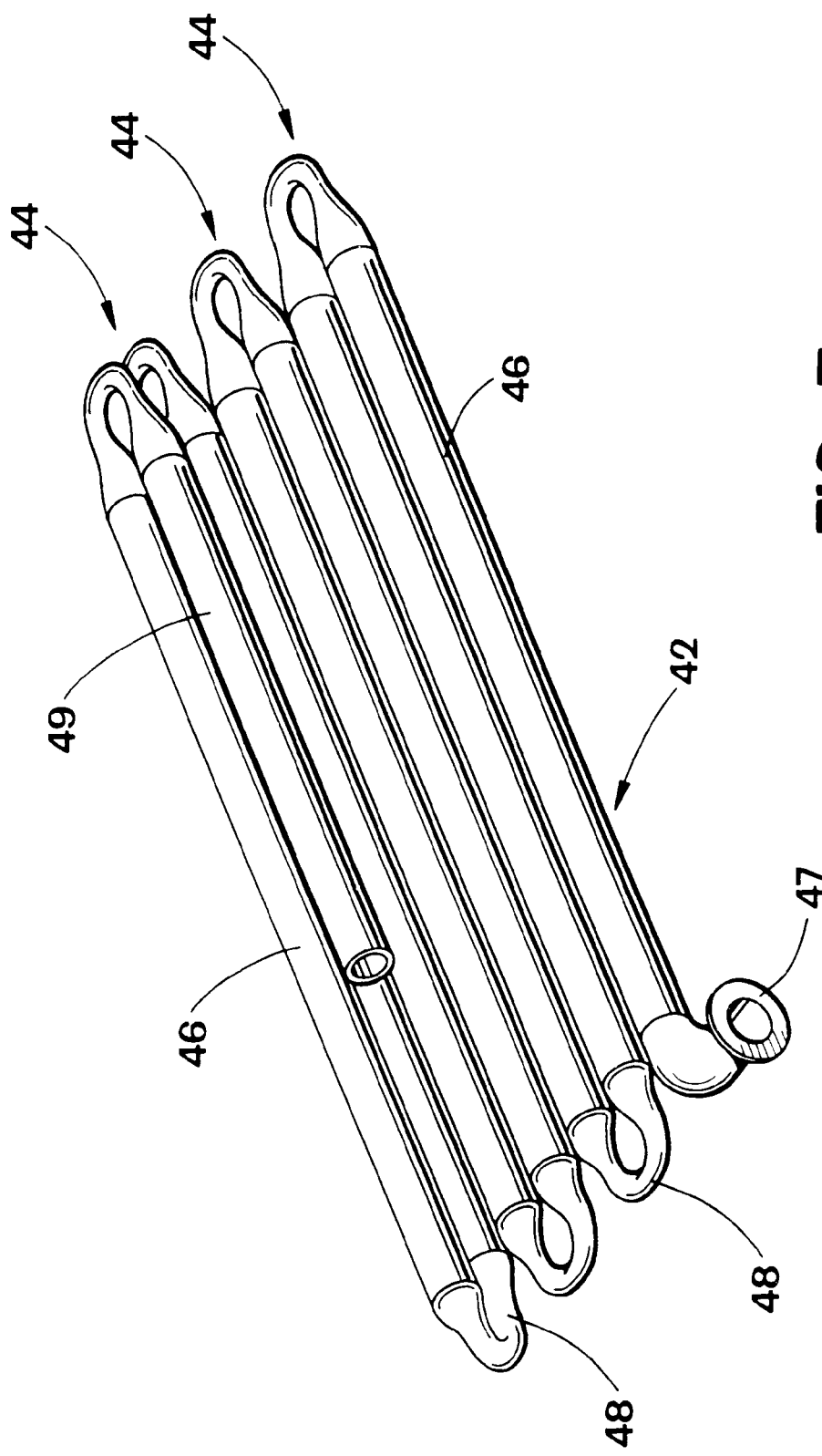
FIG. 5 is a perspective view of continuous pipe in U-shaped loops lying back to back to form a single layer.

Perfect hexagonal packing may be obtained with pipe distributed within, for example, a rectangular container, such as the hold of a ship, in the manner shown in FIG. 5. Each layer of pipe 42 is formed of loops 44 that are U-shaped, with straight sections 46 alternating with bends 48. The pipe is thinned at the bends by rolling the pipe in conventional manner and then bending it into 180° bends. Additional layers may be formed in the manner illustrated by end 49 of the continuous pipe which overlies the underlying layer in a hexagonal packing pattern. End 47 is flanged to receive a valve (not shown). While this embodiment has the advantage of hexagonal packing, gas flow will be restricted in the continuous pipe at the bends, making a preferred embodiment when charging and discharging of gas into the continuous pipe is desired to be at a relatively slow rate.

Figure 6:
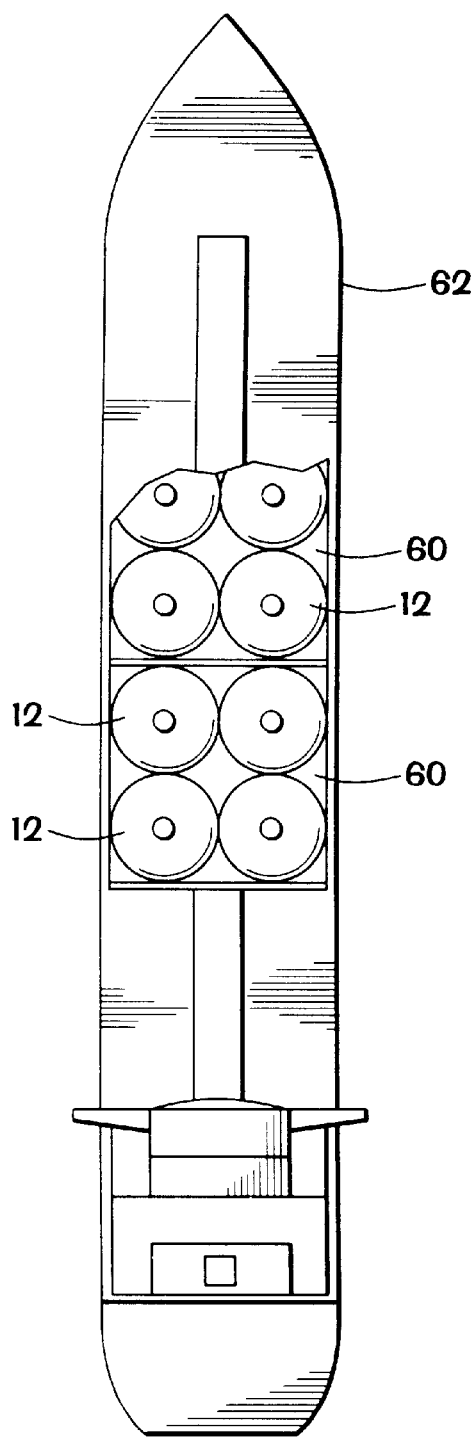
FIG. 6 is a plan view of a ship, partly cut away, with spool containers containing continuous pipe, in which the containers are oriented with vertical axes and are packed in a cubic pattern between transverse bulkheads.
Figure 7:
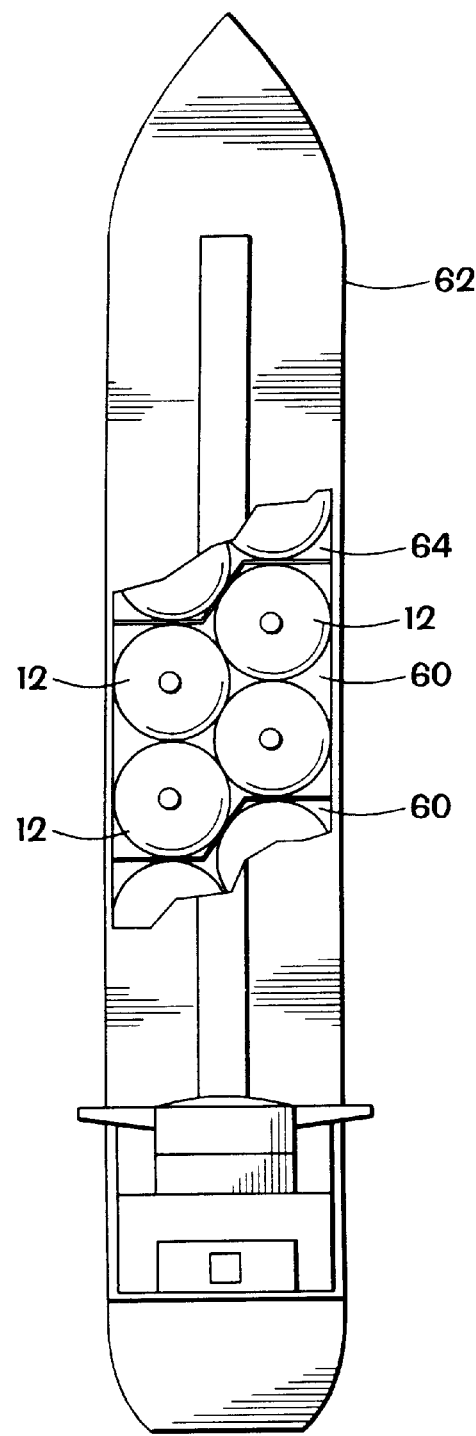
FIG. 7 is a plan view of a ship, partly cut away, with spool containers containing continuous pipe, in which the containers are oriented with vertical axes and are packed in a hexagonal pattern within semi-hexagonal bulkheads.
Figure 8:
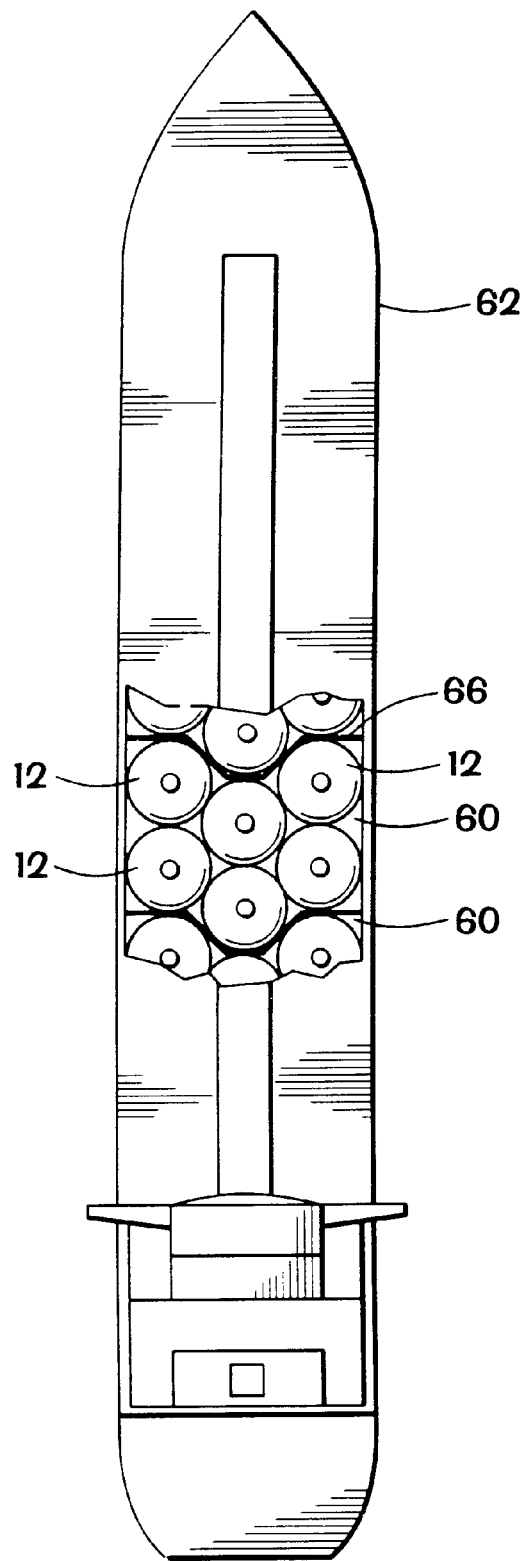
FIG. 8 is a plan view of a ship with hexagonally packed containers with three rows of containers within semi-hexagonal bulkheads.
Figure 9:
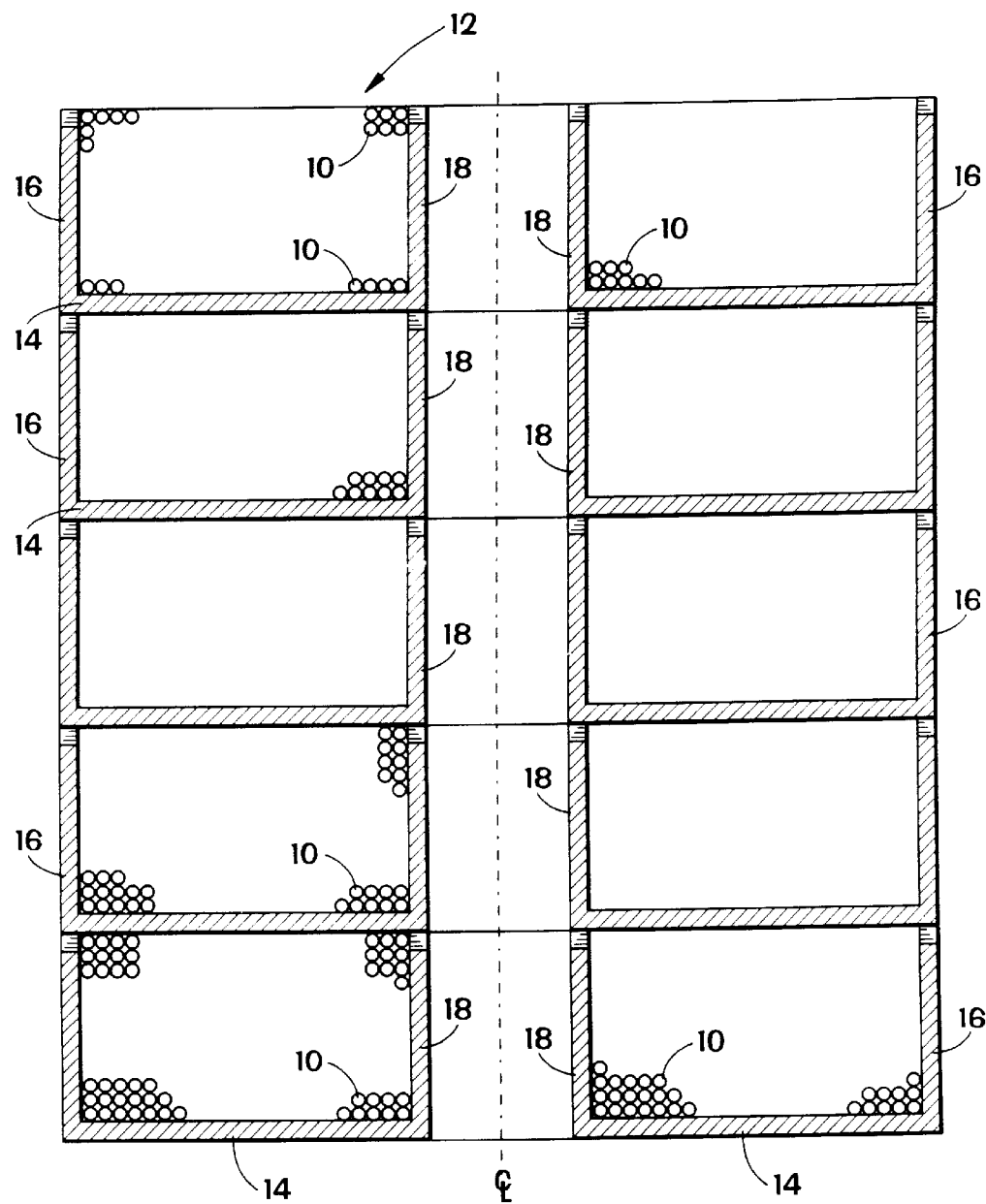
FIG. 9 is a cross-section through five spool containers stacked upon each other with continuous pipe wound around the spool (not all the pipes are shown)

Continuous pipe wound in a container with a coil, as for example shown in FIG. 2A, where the coil has a vertical axis, may be transported in a hold 60 of a ship 62 as shown in FIGS. 6, 7 and 8. A ship's hold may be, for example, about 100 ft wide and 700 ft long, and is preferably sealed with a controlled atmosphere, similar to the sealing of the containers 12. The containers 12 may be side by side in a cubic pattern as shown in FIG. 6. This results in space utilization of about 75.4% for twenty-eight 50 ft. diameter containers 12. The containers 12 may also be arranged in a two row or three row hexagonal pattern as shown in FIGS. 7 and 8. The holds 60 in FIGS. 7 and 8 respectively are separated by hexagonal bulkheads 64, 66. In FIG. 7, the space utilization for twenty six 53.6 ft. containers is about 81.25% and in FIG. 8 for fifty seven 36.603 ft. diameter containers is about 79.81%. Preferably, the containers 12 will be stacked in the ship's hold as shown in FIG. 9, for example with a stack of five containers 12 each about 11 ft high to a total height of about 55 ft. The total height of the stack of containers 12 is limited by considerations of ship stability. Alternatively, the containers 12 may be oriented with their axes horizontal. In a further alternative, the ship's hold may be contoured to form a cylindrical base in which a coil or coils having a horizontal axis parallel to the ship's longitudinal axis may be rested. While a single coil extending the length of the ship may be advantageous, it may be difficult for some shipyards to install. Installing several smaller coils connected serially, each comprising several layers and having a horizontal axis, may be easier for some shipyards to manage without damaging the continuous pipe 10.

Figure 10:
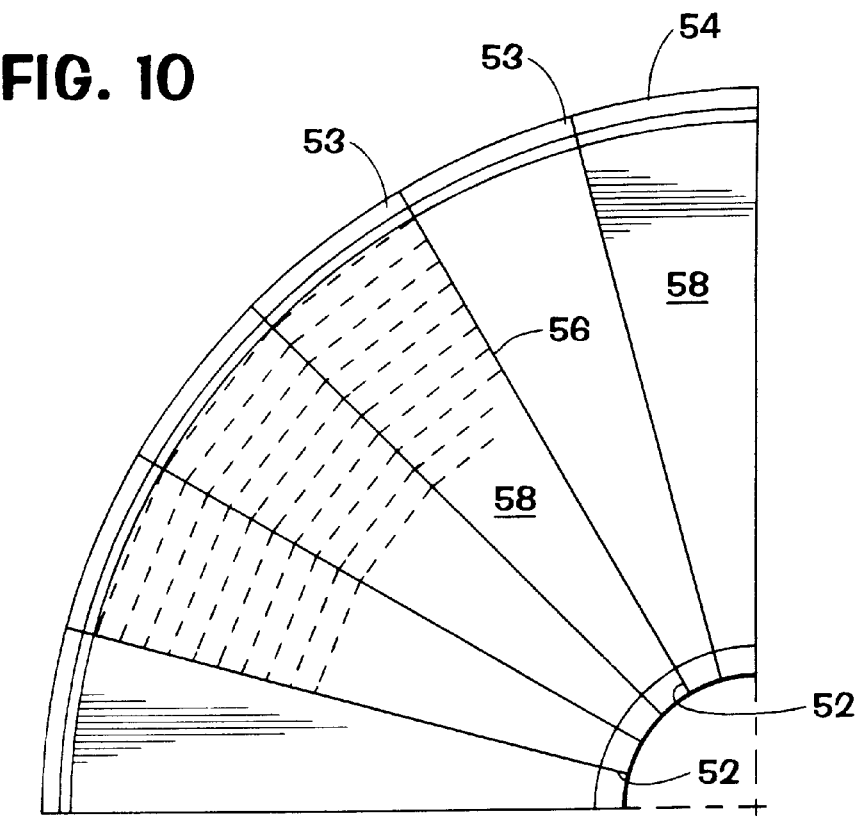
FIG. 10 is a top plan view of the base of a container in accordance with one embodiment of the invention.
Figure 10A:
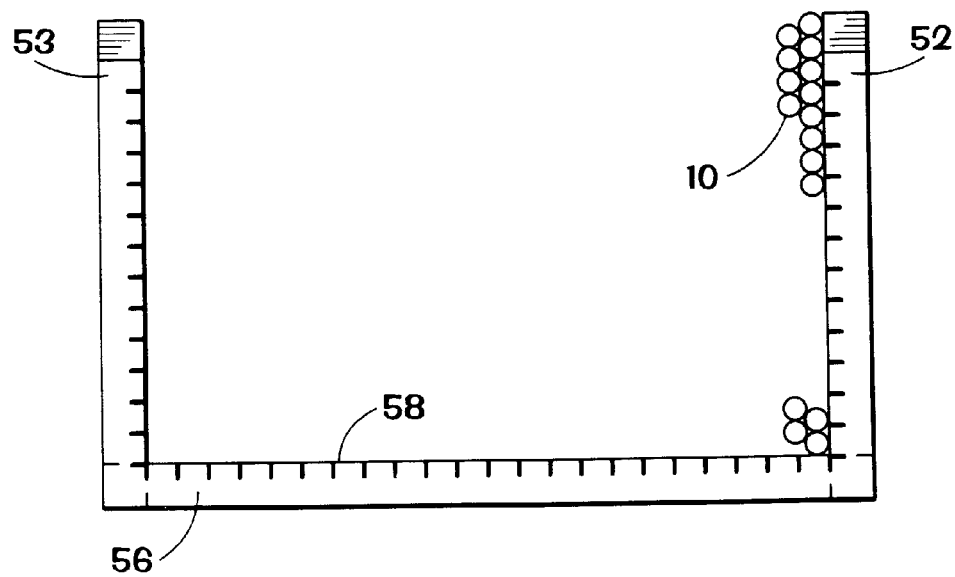
FIG. 10A is a section through a container for use in accordance with the invention.
Figure 11A:
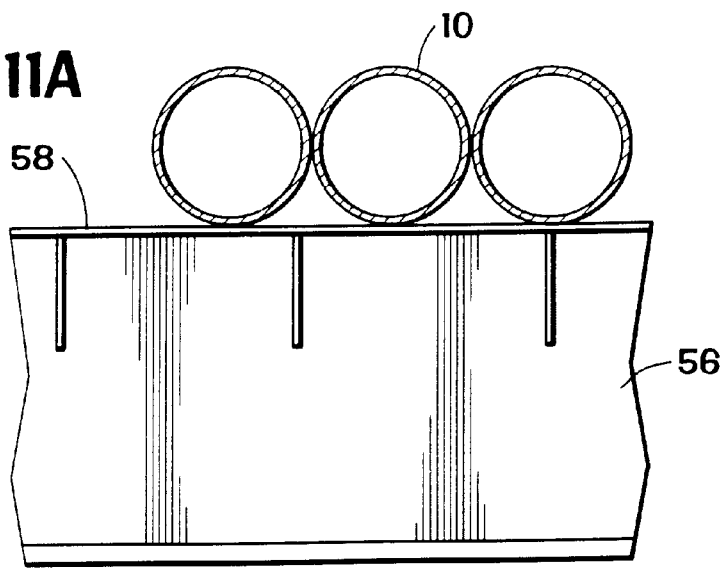
FIG. 11A is a radial section through the base of the container of FIG. 11.
Figure 11B:
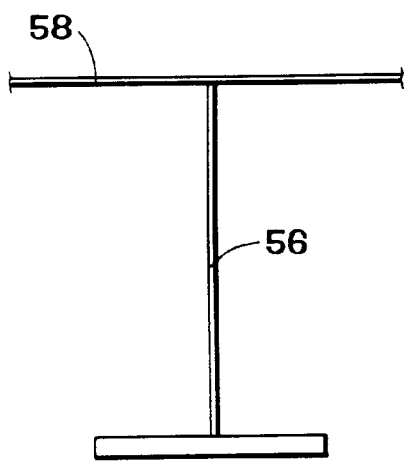
FIG. 11B is a section through the base of a container perpendicular to the section of FIG. 11A.
Figure 11C:
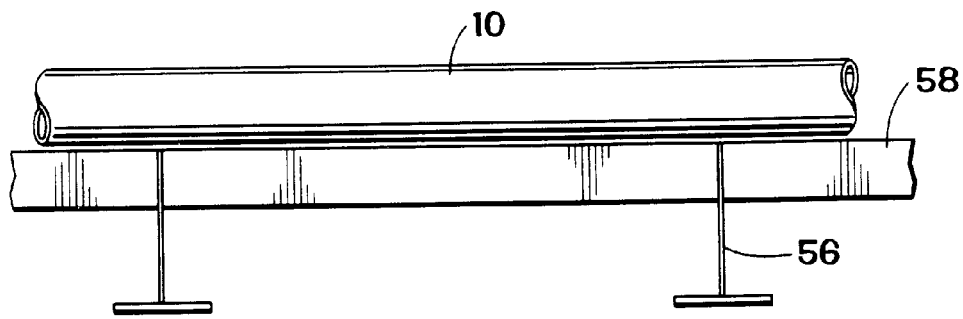
FIG. 11C is a radial view of the base of the container of FIG. 10.
Figure 12:
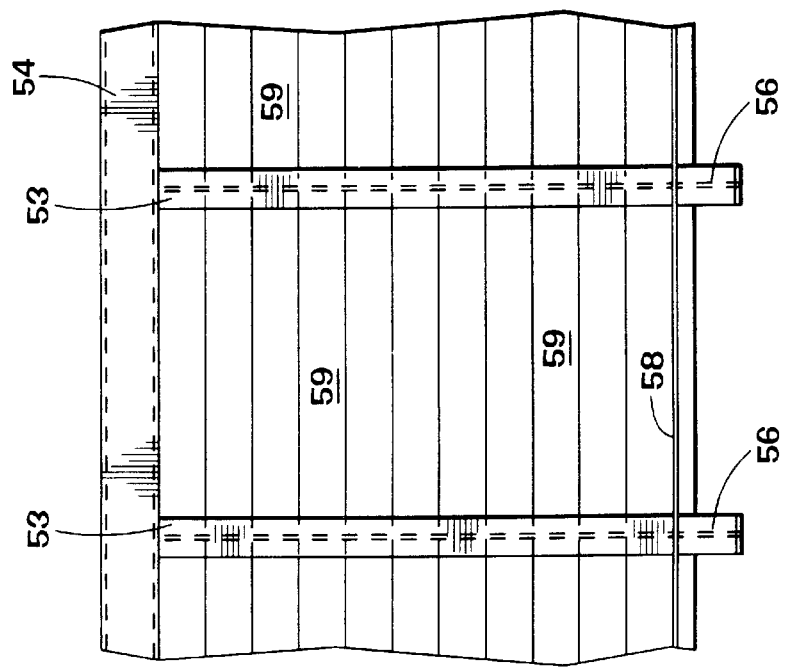
FIG. 12 is a side elevation view of a side wall of the container of FIG. 10.

The containers 12 are preferably stacked, such that there are for example about five containers 12 stacked as illustrated in FIG. 9, with walls 16, 18 of lower containers 12 supporting the upper containers. The containers 12 may be constructed in any of various ways, so long as they are capable of supporting and containing the continuous pipe 10. As illustrated in FIGS. 10–12, the container 12 may be formed of 24 vertical columns 52 on the inside and 24 vertical columns 53 on the outside, the outside vertical columns 53 being topped with a box ring beam 54 and spaced at 36 inch center to center spacings. The base or floor 14 of the container 12 is supported by 24 I-beams 56 covered with plates 58. The I-beams 56 connect respective ones of the inner columns 52 and the outer columns 53. As an example, the outer columns 53 may be formed of a 12×4 web with 8×6 flanges, with the inner columns 52 having slightly smaller flanges. The floor I-beams 56 may have a 12×3 web and 8×7 flanges. The walls 16, 18 and floor 14 are covered with flat plates 58, 59 and sealed so as to be impervious to fluid in the container. The containers 12 so formed are preferably provided with a lid 20 as shown in FIG. 3, and sealed during operation. Except for the top container, the lid of the next lower container 12 may be provided by the base of the container 12 above.

Where multiple continuous pipes 10 are transported together, they may be connected together serially such that all of the continuous pipes 10 in a ship's hold, for example, may be circulated with gas at the same time and such that a pig may be run through them in one pass for inspection and cleaning services. The continuous pipes 10 in the ship's hold may be provided with a controlled atmosphere and with insulated walls.

When transport is completed, the continuous pipes 10 in a ship's hold may then be connected to an on-shore or off-shore buoy terminal by high, intermediate and low pressure manifolds 25A, 25B and 25C (FIG. 1) as also described in co-pending application Ser. No. 08/550,080 filed Oct. 30, 1995, the content of which is herein incorporated by reference.

Gas being supplied to the pipes 10 may be refrigerated before being pumped into the continuous pipes 10. For cold transportation, it is preferred that the containers 12 be insulated with insulation 41 applied to all external walls of the containers 12.

For use in transporting gas, for example natural gas, from a gas supply point, for example an on shore terminal or an off-shore buoy, to a distant gas distribution facility, for example another on shore terminal or an offshore buoy, a gas supply must first be provided at the gas supply point. For example, gas could be transported to the on-shore or off-shore gas supply point by a pipeline. The gas is then compressed into the continuous pipes 10, and, for example, stacked in a ship 62 as shown in FIGS. 6, 7 or 8 through manifolds 25A, 25B and 25C (FIG. 1) at a pressure for example of about 3000 psi. This pressure could be ramped, for example from 800 psi to 1500 psi and then from 1500 psi to 3000 psi to make compression more efficient. The continuous pipes 10 are then transported, for example by the ship 62, to the distant gas distribution facility, where the gas is discharged through the manifolds 25A, 25B and 25C.

Preferably, the gas is discharged at the gas distribution facility in a manner that cools the continuous pipe 10. This may be achieved, for example, by allowing the gas to expand out of the pipes 10, in a rolling procedure in which a first pipe 10 is emptied, initially through the high pressure manifold 25A, then the medium pressure manifold 25B and then the low pressure manifold 25C. When the first pipe 10 is emptying through the medium pressure manifold 25B, the next pipe 10 may be emptied through the high pressure manifold 25B, and so on until all pipes 10 are emptied. The expansion of the gas in the continuous pipes 10 cools the continuous pipe, for example down to 0° F., but not lower than the temperature at which the pipe itself becomes brittle. The cooled pipe may then be transported back to the remote gas supply point to charge the pipes again with gas. Since the pipes are already cooled, a greater weight of gas may be charged while filling the pipes at the gas supply point to a given pressure. For maximal advantage from this manner of operation, the pipes 10, containers 12 and the ship's hold 60 may be covered with insulation 41. Cooling of the continuous pipe 10 may be enhanced by dropping the pressure in a heat exchanger on the deck of the ship against either inert gas which can be circulated through the containers 12 but outside the pipes 10, or medium pressure gas which can be expanded and circulated through the continuous pipes 10 which already have been emptied. In addition, refrigeration may be used to cool the gas before injection into the continuous pipes 10.

Gas in the continuous pipes 10 may be discharged by injecting a non-corrosive non-aqueous incompressible fluid that is not miscible with the gas (for example a liquid hydrocarbon having more than about 7 carbon atoms in the case of natural gas storage and transportation) at one end of the continuous pipe 10 and forcing gas out of the other end. Such a liquid may be stored in a liquid storage container 80 and forced into the pipes 10 through high and low pressure fluid supply lines 29A and 29B using pump 82. The storage container 80 may be connected via line 81 to augment the ship's fuel supply (not shown) since after use the fluid will contain dissolved gas which will come out of the solution inside the container 80.

In a similar manner, the pipes 10 may be charged by filling the pipe with a high pressure gas at one end from for example the manifold 25A and pushing the incompressible liquid out of the pipes 10 at the other end at a constant pressure. The pushed pressurized liquid may then be passed through an energy removal unit 86 such as a turbine to generate electricity or refrigeration on a line 88 controlled by valve 90 connecting the high and low pressure fluid supply lines 29A and 29B, and then used for filling the next in a series of continuous pipes 10 by injecting it into the bottom of the next pipe. Once filling of the continuous pipes 10 is completed, the liquid is returned via line 29A and line 84 to the liquid storage container 80. When filling the pipe 10 it is first filled with an incompressible liquid. The continuous outflow of the incompressible liquid should be regulated with valves, for example valves 31, and the energy removal unit 86 to maintain the incoming gas approximately constant pressure, thus avoiding unnecessary heat gain due to the expansion and recompression of the gas while filling the continuous pipe 10.

During discharging of the gas at the gas distribution facility, when the gas is first discharged, it may be discharged through the high pressure line 25A to shore (in direction A). End B of the lines 25A, 25B and 25C may be connected to other containers 12 in other holds of the ship. A part of the high pressure gas in line 25A may be directed through valve 43 and heat exchanger 72 to medium pressure line 25B. The gas adiabatically reduces pressure through the heat exchanger 72 and cools. In addition, a part of the high pressure gas from line 25A may be recirculated back to the continuous pipes 10 through valve 45, the heat exchanger 72, line 51 and line 29A without a reduction in pressure. However, as the gas directed from the high pressure line 25A to line 25B is reduced in pressure, with a drop for example in the order of 1500 psi, it cools the gas directed back to the continuous pipes 10 through the heat exchanger 72. This cooling may be substantial, and may cool the gas to −50° F. or lower. As the pressure drops in the pipes, the lines 25A, 25B and 25C may be sequentially selected to discharge the gas from the pipes. After cooling, the ship 62 may return to the gas supply point loading facility for another load of gas, with the pipes 10 remaining cold.

Figure 13:
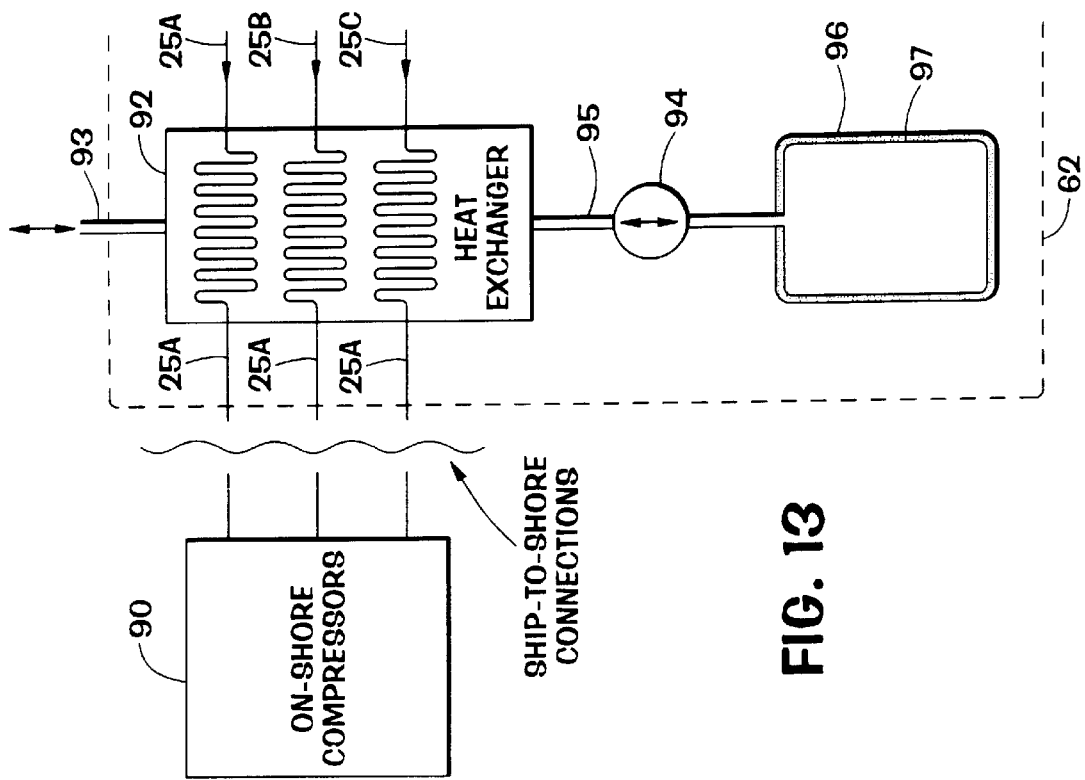
FIG. 13 is a schematic of a system for the conservation of cold in gas discharged from, for example, a ship.

It is expected that by cooling the continuous pipes 10 with cold gas from the heat exchanger 72, the continuous pipes 10 on the return journey will have a temperature in the order of −50° F. After loading the pipes 10 with gas, and returning to the discharge point, the temperature of the gas in the pipes 10 will increase to about 0° F. It is desirable to recover this cold from the gas during discharge of the gas at the gas distribution facility. For that purpose, referring to FIG. 13, as the gas is being discharged from the continuous pipes 10 through lines 25A, 25B or 25C and ship-to-shore connections using on-shore compressors 90 the gas is piped through a heat exchanger 92 against a flow, preferably countercurrent, of a suitable transportable fluid such as sea water. The sea water is pumped through the heat exchanger 92 with for example a pump 94. During discharge of the gas, the sea water is pumped from the sea at 93 through the heat exchanger 92 and line 95 into storage tanks on board the ship, which may for example be insulated ballast tanks 96 located within the double hull or double bottom of the ship. In this way, the sea water is cooled, but not to the point at which ice is formed, and forms a store of high heat capacity cold fluid. During subsequent filling of the pipes 10 at the loading facility, again using on-shore compressors, the cold sea water may be pumped from the ballast tanks 96 through the heat exchanger 92 and back to the sea, thus cooling any gas flowing through the lines 25A, 25B and 25C into the pipes 10. A ship may carry in the order of 17,000 tons of gas for the loaded voyage to the gas distribution facility, and may carry in its ballast tanks 10,000–15,000 tons of cooled sea water on the return voyage back to the gas supply point.

This aspect of the invention may be used particularly advantageously with the continuous pipe coils 10, but may also be used with other gas storage containers, such as straight cylinders as disclosed in our prior patent application. A cold gas storage container in this context means a container whose temperature is below ambient temperatures (the temperature of the air through which the vehicle, for example the ship, moves), but is preferably much lower than ambient temperatures. In addition, where large volumes of gas are being transported by land, the technique may also be used in principle, although the cold storage fluid may, in that instance, be some other fluid such as ordinary water.

Ships used for the transport of gas according to this invention should be double hulled and meet all safety requirements for the transportation of hazardous material.

It is expected that, for the transport of natural gas, about 95% of the gas can be discharged while reducing the pressure in the continuous pipes 10 to about 150 psi. This amount of gas provides a heel or supply of undischarged gas which may be used as fuel for the ship's engines on the next leg of the ship's voyage back to the gas supply point.

Any safely transportable gas may be transported with the gas storage device of the invention, such as natural gas, town gas, chlorine, hydrogen, oxygen, nitrogen, argon, ethane and ethylene.

In a further embodiment, the storage device of the invention may be placed within a barge and moored close by a city together with a compressor and connected to a major gas supply pipeline to provide gas supply during hours of peak demand. During periods of low demand, the storage device may be replenished. The storage device could also be placed in a building on land or underground to provide a similar function, for example for the storage of natural gas for an electric power plant or town gas for a city. In smaller sizes, the storage device of the invention could be used to store compressed natural gas (CNG) in a CNG fuelling station for vehicles.

Having now disclosed the invention, it is understood that a person skilled in the art could make modifications to the disclosed invention without departing from the essence of the invention that is covered by the scope and meaning of the claims that follow.

We claim:

1. A method of transporting gas to a gas distribution facility, said method comprising the steps of:
    obtaining a supply of gas at a gas supply point remote from the gas distribution facility;
    injecting the gas into a substantially continuous pipe bent to form plural layers, each of said plural layers including plural loops of pipe;
    transporting said substantially continuous pipe along with the gas to the gas distribution facility; and
    discharging the gas at the gas distribution facility.

2. The method as defined in claim 1 in which said substantially continuous pipe is transported in a hold of a ship.

3. The method as defined in claim 1 further including the steps of:
    discharging the gas at the gas distribution facility in a manner that cools said substantially continuous pipe; and
    returning said cooled substantially continuous pipe to a gas supply point.

4. The method as defined in claim 3 in which discharging the gas at the gas distribution facility further includes the steps of:
    adiabatically reducing pressure of the gas in a heat exchanger;
    cooling a fluid passing through said heat exchanger; and
    circulating said cooled fluid into said substantially continuous pipes.

5. The method as defined in claim 2 in which discharging the gas at the gas distribution facility further includes the steps of:
    cooling a storable fluid with the gas; and
    storing said storable fluid on board the ship.

6. The method as defined in claim 5 in which cooling said storable fluid further includes the step of:
    piping the gas through a heat exchanger against a flow of said storable fluid to cool said storable fluid.

7. The method as defined in claim 5 further including the steps of:
    returning said substantially continuous pipes and said cooled storable fluid to a gas supply point;
    cooling the gas obtained at the gas supply point with said cooled storable fluid;
    re-filling said substantially continuous pipes with gas.

8. A method of storing gas comprising the steps of:
    supplying gas when demand for the gas is low into a substantially continuous pipe bent to form plural layers, each of said plural layers including plural loops of pipe;
    storing the gas in said substantially continuous pipe; and discharging the gas from said substantially continuous pipe when demand for the gas is high.

9. The method as defined in claim 8 in which said substantially continuous pipe is enclosed in a sealed container.

10. The method as defined in claim 8 in which the gas is stored in plural substantially continuous pipes, each substantially continuous pipe being bent to form plural layers, each of said plural layers including plural loops of pipe, and each substantially continuous pipe is enclosed in a sealed container.

11. The method as defined in claim 10 in which said substantially continuous pipes are charged serially.

12. A method of transporting gas to a gas distribution facility, said method comprising the steps of:

obtaining a supply of gas at a gas supply point remote from the gas distribution facility;

transporting the gas to the gas distribution facility in cold gas storage containers;

discharging the gas at the gas distribution facility while conserving said cold of said gas storage containers; and returning said cold gas storage containers to said gas supply point, with said containers retained in said cold condition.

13. The method as defined in claim 12 in which said cold storage containers are transported in a hold of a ship.

14. The method as defined in claim 13 in which discharging the gas at the gas distribution facility further includes the steps of:

adiabatically reducing pressure of the gas in a heat exchanger;

cooling a fluid passing through said heat exchanger; and circulating said cooled fluid into said gas storage containers.

15. The method as defined in claim 13 in which discharging the gas at the gas distribution facility further includes the steps of:

cooling a storable fluid using the gas; and storing said cooled storable fluid on board the ship.

16. The method as defined in claim 15 in which cooling said storable fluid further includes the step of:

piping the gas through a heat exchanger against a flow of said storable fluid to cool said storable fluid.

17. The method as defined in claim 15 further including the steps of:

returning said gas storage containers and said cooled storable fluid to a gas supply point;

re-filling said gas storage containers with gas; and cooling the gas with said cooled storable fluid.

18. A method of supplying gas to a gas distribution facility comprising the steps of:

conducting the gas from a gas well to a gas supply point;

obtaining a supply of gas at said gas supply point, said gas supply point being at a location remote from the gas distribution facility;

cooling and compressing the gas at said gas supply point;

injecting said cooled and compressed gas into a substantially continuous pipe bent to form plural layers, each of said plural layers including plural loops of pipe;

transporting said cooled and compressed gas in said substantially continuous pipe to the gas distribution facility; and discharging said cooled and compressed gas at the gas distribution facility.

19. The method as defined in claim 18 wherein the substantially continuous pipe is contained within the hold of a ship.

20. A method of supplying gas to users comprising the steps of:

conducting the gas from a gas well to a gas supply point;

obtaining a supply of gas at said gas supply point, said gas supply point being at a location remote from the users;

cooling and compressing the gas at said gas supply point;

injecting said cooled and compressed gas into a substantially continuous pipe bent to form plural layers, each of said plural layers including plural loops of pipe;

transporting said cooled and compressed gas in said substantially continuous pipe to a gas distribution facility;

discharging said cooled and compressed gas at said gas distribution facility;

conducting the gas from said gas distribution facility to the users.

21. The method as defined in claim 20 wherein the substantially continuous pipe is contained within the hold of a ship.

* * * * *

UNITED STATES PATENT AND TRADEMARK OFFICE
CERTIFICATE OF CORRECTION

PATENT NO. : 6,003,460
DATED : December 21, 1999
INVENTOR(S) : David G. Stenning and James A. Cran It is certified that error appears in the above-identified patent and that said Letters Patent is hereby corrected as shown below:

On the title page, at block [60] correct "December 30, 1995" to read "October 30, 1995".

Signed and Sealed this

Eighth Day of August, 2000

Attest:

Q. TODD DICKINSON

*Attesting Officer*  *Director of Patents and Trademarks*